US009733432B2

(12) United States Patent
Jiang et al.

(10) Patent No.: US 9,733,432 B2
(45) Date of Patent: Aug. 15, 2017

(54) 3D-MEMS OPTICAL SWITCH (71) Applicant: Huawei Technologies Co., Ltd., Shenzhen (CN)

(72) Inventors: Chendi Jiang, Wuhan (CN); Chunhui Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/153,290

(22) Filed: May 12, 2016

(65) Prior Publication Data

US 2016/0259127 A1 Sep. 8, 2016

Related U.S. Application Data (63) Continuation of application No. PCT/CN2014/075565, filed on Apr. 17, 2014.

(30) Foreign Application Priority Data

Nov. 15, 2013 (CN) .............................. 201310573872

(51) Int. Cl.
G02B 6/35 (2006.01)
H04Q 11/00 (2006.01)
(Continued)

(52) U.S. Cl.
CPC ............. *G02B 6/3588* (2013.01); *G02B 6/34* (2013.01); *G02B 6/3518* (2013.01);
(Continued)

(58) Field of Classification Search
None
See application file for complete search history.

(56) References Cited

U.S. PATENT DOCUMENTS 6,549,691 B1 * 4/2003 Street .................. G02B 6/3586
385/16
6,567,574 B1 * 5/2003 Ma ..................... H04Q 11/0005
385/16

(Continued)

FOREIGN PATENT DOCUMENTS

CN 1528103 A 9/2004
CN 101968569 A 2/2011
(Continued)

*Primary Examiner* — Tina Wong
(74) *Attorney, Agent, or Firm* — Slater Matsil, LLP (57) ABSTRACT A 3D-MEMS optical switch is disclosed. In an embodiment, the 3D-MEMS optical switch includes a collimator array, a PD array, a wedge prism, a light-splitting triangular prism, a micro-electro-mechanical system MEMS micro-mirror, and a core optical switch controller that is connected to the PD array and the MEMS micro-mirror. In the present invention, the PD array is integrated into a core optical switch, which simplifies an architecture of the optical switch and reduces a volume of the optical switch; the wedge prism and the light-splitting triangular prism are used to perform light splitting, and some optical signals are transmitted to the PD array to detect optical power, so that the core optical switch controller adjusts the MEMS micro-mirror according to the optical power, which is detected by the PD array, of the optical signal, making an insertion loss of the 3D-MEMS optical switch meet a preset attenuation range.

17 Claims, 3 Drawing Sheets (51) Int. Cl.
  *G02B 6/34* (2006.01)
  *G02B 6/42* (2006.01)
(52) U.S. Cl.
  CPC ......... *G02B 6/3556* (2013.01); *G02B 6/4286* (2013.01); *H04Q 11/0005* (2013.01); *H04Q 2011/003* (2013.01); *H04Q 2011/0026* (2013.01); *H04Q 2011/0039* (2013.01)

(56) References Cited

U.S. PATENT DOCUMENTS

| | | | | |
|---|---|---|---|---|
| 6,711,314 | B1* | 3/2004 | Mori | G02B 6/359 |
| | | | | 385/17 |
| 6,922,500 | B2* | 7/2005 | Huang | H04Q 11/0005 |
| | | | | 385/18 |
| 6,934,438 | B2* | 8/2005 | Hoke | G02B 6/359 |
| | | | | 385/16 |
| 6,947,629 | B2* | 9/2005 | Chu | G02B 6/359 |
| | | | | 385/17 |
| 8,817,359 | B2* | 8/2014 | Chau | H04Q 11/0005 |
| | | | | 359/290 |
| 9,338,528 | B2* | 5/2016 | Borkenhagen | H04Q 11/0005 |
| 9,529,157 | B2* | 12/2016 | Zhang | G02B 6/3518 |
| 2005/0213978 | A1* | 9/2005 | Yamashita | H04J 14/0212 |
| | | | | 398/79 |
| 2013/0107347 | A1* | 5/2013 | Chau | G02B 6/3546 |
| | | | | 359/290 |
| 2013/0336615 | A1 | 12/2013 | Wang et al. | |
| 2013/0343758 | A1 | 12/2013 | Wang et al. | |

FOREIGN PATENT DOCUMENTS

| | | |
|---|---|---|
| CN | 102135645 A | 7/2011 |
| CN | 102135647 A | 7/2011 |
| CN | 102645705 A | 8/2012 |
| WO | 0133896 A1 | 5/2001 |
| WO | 0180593 A3 | 10/2001 |
| WO | 03003787 A1 | 1/2003 |

\* cited by examiner

3D-MEMS OPTICAL SWITCH

CROSS-REFERENCE TO RELATED APPLICATIONS

This application is a continuation of International Application No. PCT/CN2014/075565, filed on Apr. 17, 2014, which claims priority to Chinese Patent Application No. 201310573872.2, filed on Nov. 15, 2013, both of which are hereby incorporated by reference in their entireties.

TECHNICAL FIELD

The present invention relates to the communications field, and in particular, to a 3D-MEMS optical switch.

BACKGROUND

With continuous development of information technologies, the development of a DWDM (Dense Wavelength Division Multiplexing, dense wavelength division multiplexing) technology provides an effective way for point-to-point large-capacity transmission of optical fibers. In an all-optical communications network, capacity expansion is implemented on a trunk by using the DWDM technology, and optical information exchange is implemented on a cross-connect node by using an optical add/drop multiplexer (OADM) and an optical cross connect (OXC), and fiber to the home (FTTH) is implemented by using an optical fiber access technology. The OXC and the OADM are core technologies of the all-optical network, and the cores of the OXC and the OADM are an optical switch and an optical switch array, micro-electro-mechanical system (MEMS) optical switches may be classified into 2-dimensional micro-electro-mechanical system (2D-MEMS) optical switches and 3-dimensional micro-electro-mechanical system (3D-MEMS) optical switches. Due to unbalanced insertion losses between paths, a 2D-MEMS optical switch cannot be implemented as a large-scale switch array. Because there is a small difference between distances between ports, a 3D-MEMS optical switch can be implemented as a switch matrix of a very large scale. Therefore, the 3D-MEMS optical switch can implement a large-capacity OXC node, which is applicable to the large-capacity optical switching field.

In a 3D-MEMS, an objective of switching an optical channel is achieved through rotation of a micro-mirror and deflection of an optical channel. Due to factors such as inertia and vibration, the micro-mirror cannot rotate to an optimal position quickly and steadily; as a result, an insertion loss of a 3D-MEMS optical switch cannot reach an optimal status. In the prior art, power detection modules are added to an input port and an output port of an optical fiber, input power is compared with output power, a comparison result is fed back to the micro-mirror, and a close loop feedback mechanism is formed, so as to control the micro-mirror. In this way, the micro-mirror is calibrated to an optimal status, to make the insertion loss of the 3D-MEMS optical switch be the smallest.

Figure 1:
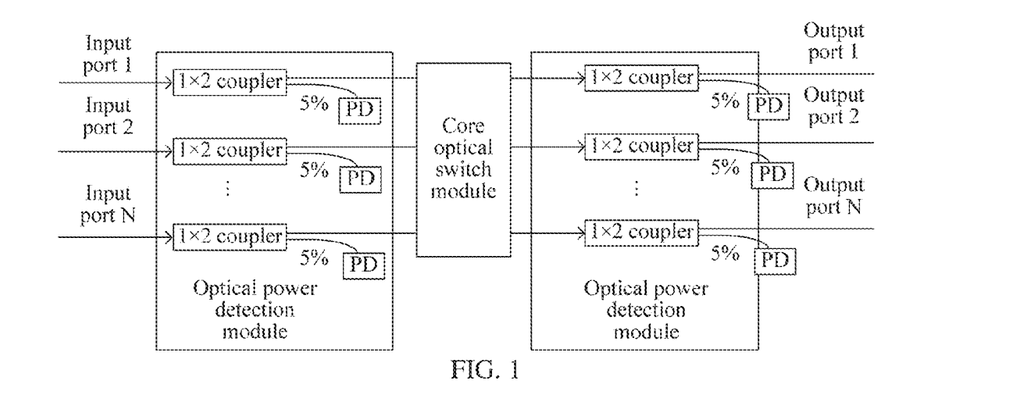
FIG. 1 is a schematic structural diagram of a 3D-MEMS optical switch in the prior art.

For the 3D-MEMS optical switch in the prior art, an optical power detection module and a core optical switch module of the optical switch are separately disposed. As shown in FIG. 1, an optical power detection module of an optical switch is located at an input/output port, each input port is connected to one 1×2 coupler (coupler), and two output ports of the coupler can perform light splitting according to a requirement, such as 5%:95%, 2%:98%, or 10%:90%. A port with a small split ratio is connected to a PD (power detector, power detector), which is configured to detect optical power. The other port with a large split ratio is connected to a core optical switch module. All couplers and PDs of the input ports are disposed in one optical power detection module, and similarly, one optical power detection module is also formed at the output port.

In the prior art, power detection modules are added to an input port and an output port of an optical fiber; and a core optical switch module and an optical power detection module are separately disposed, and both need to be connected to a main control board by using data cables. A length of a data cable limits a communication rate between the optical power detection module and the core optical switch module, and a time for a micro-mirror to stabilize after calibration is prolonged. When a large-scale 3D-MEMS optical switch needs to be implemented, a relatively large quantity of couplers and PDs need to be used, and a volume of the optical power detection module becomes very large, which does not facilitate actual use. Each port uses one coupler and one PD, and as a scale of a 3D-MEMS increases, costs are increased.

SUMMARY

Embodiments of the present invention provide a 3D-MEMS optical switch, which integrates an optical power detection module into a core optical switch module, so as to implement integration of the optical power detection module and the core optical switch module, and resolve technical problems of a large volume, high costs, and a long time for an MEMS micro-mirror to stabilize after adjustment. These problems are caused by separation of the optical power module and the core optical switch module.

To resolve the foregoing technical problems, a first aspect of the embodiments of the present invention provides a 3D-MEMS optical switch, including: an input port collimator array, an input port MEMS micro-mirror, an output port MEMS micro-mirror, and an output port collimator array, where the 3D-MEMS optical switch further includes: a wedge prism, a light-splitting triangular prism, an input port power detector PD array, an output port PD array, and a core optical switch controller, where the wedge prism is disposed between the input port collimator array and the input port MEMS micro-mirror, and is configured to split an input optical signal from the input port collimator array into two channels of optical signals, transmit one channel of optical signal to the input port MEMS micro-mirror, and reflect the other channel of optical signal to the input port PD array; the input port PD array is configured to detect optical power of the input optical signal reflected by the wedge prism; the light-splitting triangular prism is disposed between the output port MEMS micro-mirror and the output port collimator array, and is configured to split an output optical signal from the output port MEMS micro-mirror into two channels of optical signals, transmit one channel of optical signal to the output port collimator array, and reflect the other channel of optical signal to the output port PD array; the output port PD array is configured to detect optical power of the output optical signal reflected by the light-splitting triangular prism; and the core optical switch controller is configured to determine, according to the optical power, which is detected by the input port PD array, of the input optical signal and the optical power, which is detected by the output port PD array, of the output optical signal, whether at least one of the input port MEMS micro-mirror and the output port MEMS micro-mirror needs to be adjusted, and if at least one of the input port MEMS micro-mirror and the output port MEMS micro-mirror needs to be adjusted, adjust at least one of the input port MEMS micro-mirror and the output port MEMS micro-mirror.

In a first possible implementation manner of the first aspect, the wedge prism includes two film-coated surfaces, the two film-coated surfaces are parallel, and are at an angle of 45 degrees to an upper horizontal plane of the wedge prism, one film-coated surface is coated with some reflective films, and the other film-coated surface is coated with a highly reflective film; the some reflective films are configured to split the input optical signal from the input port collimator array into two channels of optical signals, transmit one channel of optical signal to the input port MEMS micro-mirror, and reflect the other channel of optical signal to the highly reflective film; and the highly reflective film is configured to reflect, to the input port PD array, the optical signal reflected by the some reflective films.

In a second possible implementation manner of the first aspect, the light-splitting triangular prism includes two film-coated surfaces, the two film-coated surfaces are mutually perpendicular, one film-coated surface is coated with some reflective films, and is at an angle of 45 degrees to a bottom surface of the light-splitting triangular prism, and the other film-coated surface is coated with a highly reflective film, and is at an angle of 45 degrees to a bottom surface of the wedge prism; the some reflective films are configured to split the output optical signal from the output port MEMS micro-mirror into two channels of optical signals, transmit one channel of optical signal to the output port collimator array, and reflect the other channel of optical signal to the highly reflective film; and the highly reflective film is configured to reflect, to a PD array, the optical signal reflected by the some reflective films.

With reference to the first aspect, the first possible implementation manner of the first aspect, or the second possible implementation manner of the first aspect, in a third possible implementation manner of the first aspect, the wedge prism is fastened to the input port collimator array, or is fastened to an optical channel between the input port collimator and the input port MEMS micro-mirror by using a support.

With reference to the first aspect or any possible implementation manner of the first possible implementation manner of the first aspect to the third possible implementation manner of the first aspect, in a fourth possible implementation manner of the first aspect, the light-splitting triangular prism is fastened to the output port collimator array, or is fastened to an optical channel between the output port collimator and the output port MEMS micro-mirror by using a support.

With reference to the first aspect or any possible implementation manner of the first possible implementation manner of the first aspect to the fourth possible implementation manner of the first aspect, in a fifth possible implementation manner of the first aspect, the wedge prism is integrally molded, or includes a small wedge prism array covering one input port collimator.

With reference to the first aspect or any possible implementation manner of the first possible implementation manner of the first aspect to the fifth possible implementation manner of the first aspect, in a sixth possible implementation manner of the first aspect, the light-splitting triangular prism is integrally molded, or includes a small light-splitting triangular prism array covering one output port collimator.

With reference to the first aspect or any possible implementation manner of the first possible implementation manner of the first aspect to the sixth possible implementation manner of the first aspect, in a seventh possible implementation manner of the first aspect, a plane on which the input port collimator array is located is parallel to a plane on which the output port collimator array is located; a plane on which the input port PD array is located is parallel to a plane on which the output port PD array is located; and a plane on which the input port MEMS micro-mirror is located is parallel to a plane on which the output port MEMS micro-mirror is located.

With reference to the first aspect or any possible implementation manner of the first possible implementation manner of the first aspect to the seventh possible implementation manner of the first aspect, in an eighth possible implementation manner of the first aspect, that the core optical switch controller adjusts at least one of the input port MEMS micro-mirror and the output port MEMS micro-mirror according to the optical power, which is detected by the input port PD array, of the input optical signal and the optical power, which is detected by the output port PD array, of the output optical signal specifically includes: calculating an insertion loss of the 3D-MEMS optical switch according to the optical power, which is detected by the input port PD array, of the input optical signal and the optical power, which is detected by the output port PD array, of the output optical signal, and when the insertion loss of the 3D-MEMS optical switch does not meet a preset attenuation range, adjusting an angle of at least one of the input port MEMS micro-mirror and the output port MEMS micro-mirror.

With reference to the first aspect or any possible implementation manner of the first possible implementation manner of the first aspect to the eighth possible implementation manner of the first aspect, in a ninth possible implementation manner of the first aspect, the 3D-MEMS optical switch further includes a reflector, disposed between the input port MEMS micro-mirror and the output port MEMS micro-mirror, where the input port MEMS micro-mirror is configured to reflect, to the reflector, the optical signal transmitted by the wedge prism; the reflector is configured to reflect, to the output port MEMS micro-mirror, the optical signal reflected by the input port MEMS micro-mirror; and the output port MEMS micro-mirror is configured to reflect, to the light-splitting triangular prism, the optical signal reflected by the reflector.

With reference to the first aspect or any possible implementation manner of the first possible implementation manner of the first aspect to the eighth possible implementation manner of the first aspect, in a tenth possible implementation manner of the first aspect, the 3D-MEMS optical switch further includes a reflecting triangular prism, disposed between the input port MEMS micro-mirror and the output port MEMS micro-mirror, where the input port MEMS micro-mirror is configured to reflect, to the reflecting triangular prism, the optical signal transmitted by the wedge prism; the reflecting triangular prism is configured to reflect, to the output port MEMS micro-mirror, the optical signal reflected by the input port MEMS micro-mirror; and the output port MEMS micro-mirror is configured to reflect, to the light-splitting triangular prism, the optical signal reflected by the reflecting triangular prism.

With reference to the ninth possible implementation manner of the first aspect or the tenth possible implementation manner of the first aspect, in a eleventh possible implementation manner of the first aspect, the input port collimator array and the output port collimator array are located on a same plane; the input port PD array and the output port PD array are disposed on a same plane; and the input port MEMS micro-mirror and the output port MEMS micro-mirror are located on a same plane.

With reference to the eleventh possible implementation manner of the first aspect, in a twelfth possible implementation manner of the first aspect, the input port collimator array is integrated with the output port collimator array.

With reference to the eleventh possible implementation manner of the first aspect, in a thirteenth possible implementation manner of the first aspect, the input port PD array is integrated with the output port PD array.

With reference to the eleventh possible implementation manner of the first aspect, in a fourteenth possible implementation manner of the first aspect, the input port MEMS micro-mirror is integrated with the output port MEMS micro-mirror.

With reference to the first aspect or any possible implementation manner of the first possible implementation manner of the first aspect to the fourteenth possible implementation manner of the first aspect, in a fifteenth possible implementation manner of the first aspect, the input port PD array includes multiple sub-PD arrays.

With reference to the first aspect or any possible implementation manner of the first possible implementation manner of the first aspect to the fourteenth possible implementation manner of the first aspect, in a sixteenth possible implementation manner of the first aspect, the output port PD array includes multiple sub-PD arrays.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention provide a 3D-MEMS optical switch, including: an input port collimator array, an input port MEMS micro-mirror, an output port MEMS micro-mirror, and an output port collimator array, where the 3D-MEMS optical switch further includes: a wedge prism, a light-splitting triangular prism, an input port power detector PD array, an output port PD array, and a core optical switch controller. A PD array is integrated into a core optical switch, which simplifies an architecture of the optical switch and reduces a volume of the optical switch; the wedge prism and the light-splitting triangular prism are used to perform light splitting, and some optical signals are reflected to the PD array, which simplifies a design of a space optical channel, facilitates implementation of a large-scale 3D-MEMS optical switch, and reduces costs. Description is made below by using specific embodiments.

Figure 2:
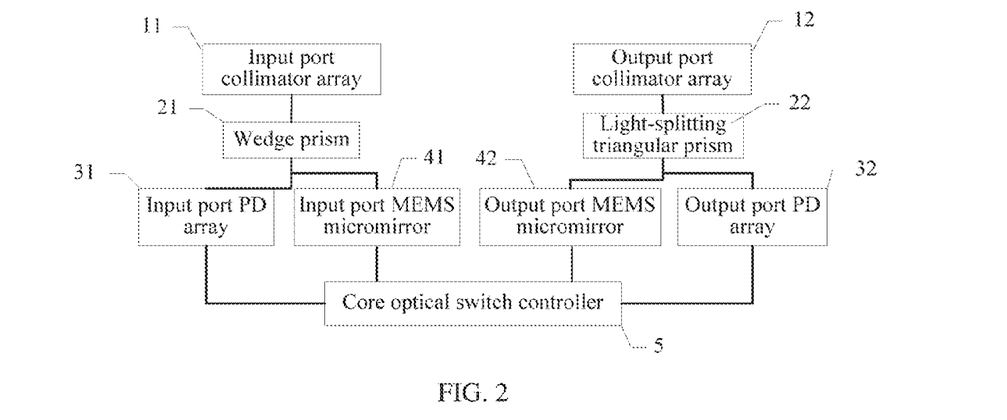
FIG. 2 is a schematic structural diagram of a 3D-MEMS optical switch according to an embodiment of the present invention.

FIG. 2 is a schematic structural diagram of a 3D-MEMS optical switch according to an embodiment of the present invention. As shown in the figure, the 3D-MEMS optical switch in this embodiment of the present invention includes: an input port collimator array 11, a wedge prism 21, an input port PD array 31, an input port MEMS micro-mirror 41, an output port collimator array 12, a light-splitting triangular prism 22, an output port PD array 32, an output port MEMS micro-mirror 42, and a core optical switch controller 5 that is in communication connection with the input port PD array 31, the input port MEMS micro-mirror 41, the output port PD array 32, and the output port MEMS micro-mirror 42, where the wedge prism 21 is disposed between the input port collimator array 11 and the input port MEMS micro-mirror 41, and is configured to split an input optical signal from the input port collimator array 11 into two channels of optical signals, transmit one channel of optical signal to the input port MEMS micro-mirror 41, and reflect the other channel of optical signal to the input port PD array 31; the input port PD array 31 is configured to detect optical power of the input optical signal reflected by the wedge prism 21; the light-splitting triangular prism 22 is disposed between the output port MEMS micro-mirror 42 and the output port collimator array 12, and is configured to split an output optical signal from the output port MEMS micro-mirror 42 into two channels of optical signals, transmit one channel of optical signal to the output port collimator array 12, and reflect the other channel of optical signal to the output port PD array 32; the output port PD array 32 is configured to detect optical power of the output optical signal reflected by the light-splitting triangular prism 22; and the core optical switch controller 5 is configured to adjust at least one of the input port MEMS micro-mirror 41 and the output port MEMS micro-mirror 42 according to the optical power, which is detected by the input port PD array 31, of the input optical signal and the optical power, which is detected by the output port PD array 32, of the output optical signal.

According to the 3D-MEMS optical switch in this embodiment of the present invention, a PD array is integrated into a core optical switch, which simplifies an architecture of the optical switch and reduces a volume of the optical switch; a separated PD is replaced by the PD array, which greatly reduces space and reduces costs. A 1×2 coupler is avoided by using a wedge prism and a light-splitting triangular prism, and costs are reduced. In addition, the wedge prism and the light-splitting triangular prism split an optical signal into two channels of optical signals, a reflected optical signal can be used for detecting optical power, and a transmitted optical signal can be used for cross-connection and grooming, which simplifies a design of a space optical channel, facilitates implementation of a large-scale 3D-MEMS optical switch, and reduces costs.

Figure 3:
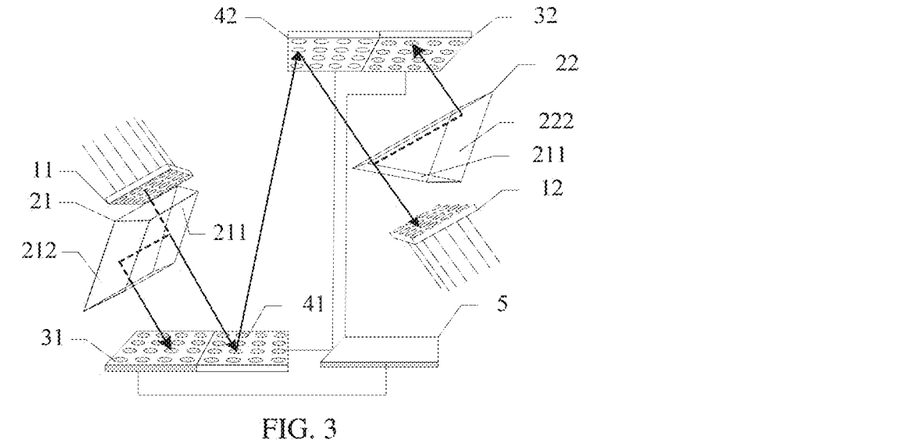
FIG. 3 is a specific schematic structural diagram of a 3D-MEMS optical switch according to a first embodiment of the present invention.

FIG. 3 is a schematic structural diagram of a 3D-MEMS optical switch according to a first embodiment of the present invention. As shown in the figure, the 3D-MEMS optical switch in this embodiment of the present invention includes: an input port collimator array 11, a wedge prism 21, an input port PD array 31, an input port MEMS micro-mirror 41, an output port MEMS micro-mirror 42, a light-splitting triangular prism 22, an output port PD array 32, an output port collimator array 12, and a core optical switch controller 5, where the core optical switch controller 5 is in communication connection with the input port PD array 31, the input port MEMS micro-mirror 41, the output port MEMS micro-mirror 42, and the output port PD array 32.

The input port collimator array 11 is configured to receive an optical signal that is input from an optical fiber. The input port collimator array 11 is an incident port of a peripheral optical signal, all optical signals enter the input port collimator array 11 through an input optical fiber, and the input port collimator array performs beam shaping on the input optical signal, which is enlarging beam waists of the optical signals and decreasing divergence angles, so that these input optical signals can be transmitted over a longer distance in free space.

The wedge prism 21 is configured to receive the optical signal from the input port collimator array 11, split an input optical signal from the input port collimator array 11 into two channels of optical signals, transmit one channel of optical signal to the input port MEMS micro-mirror 41, and reflect the other channel of optical signal to the input port PD array 31.

Optionally, the wedge prism 21 internally includes two film-coated surfaces, and the two surfaces are parallel, and are at an angle of 45 degrees to an upper horizontal plane, where the upper horizontal plane is parallel to a plane on which the input port collimator array 11 is located. One film-coated surface is coated with some reflective films, and the other film-coated surface is coated with a highly reflective film. The some reflective films can perform light splitting on incident optical signals according to a ratio, so that some incident optical signals are transmitted and some are reflected, and the highly reflective film can basically reflect all the incident optical signals. When the input optical signal from the input port collimator array 11 passes through the some reflective films 211 of the wedge prism 21, the some reflective films split the input optical signal into two channels of optical signals, one channel of optical signal is transmitted to the input port MEMS micro-mirror 41 according to a preset first ratio and the other channel of optical signal is reflected to the highly reflective film 212 of the wedge prism 21 according to a preset second ratio, and the highly reflective film 212 of the wedge prism 21 reflects the optical signal to the input port PD array 31, where the preset first ratio is, for example, 95%, the preset second ratio is, for example, 5%, and a sum of the preset first ratio and the preset second ratio is 100%. Specifically, a majority of the optical signals may be transmitted to the input port MEMS micro-mirror 41, and a minority of the optical signals may be reflected to the input port PD array 31, that is, the preset first ratio may be greater than the preset second ratio, and specific numerical values are not limited herein. In specific implementation, the wedge prism may be coated with some reflective films according to a preset split ratio, so as to control a ratio of optical signals transmitted to the input port MEMS micro-mirror to optical signals transmitted to the input port PD array, for example, a surface of the wedge prism may be coated with some corresponding reflective films according to the preset split ratio, 95% of the optical signals are transmitted to the input port MEMS micro-mirror, and 5% of the optical signals are reflected to the highly reflective film of the wedge prism, and then are reflected to the input port PD array by the highly reflective film of the wedge prism.

Further, optionally, the wedge prism 21 is integrally molded, or includes a small wedge prism array, where each small wedge prism covers one input port collimator.

The input port PD array 31 is configured to detect optical power of the input optical signal reflected by the wedge prism 21. The input port PD array 31 performs optical-to-electrical conversion on the optical signal reflected by the wedge prism 21, to detect the optical power and obtain the optical power of the input optical signal, and sends the detected optical power of the input optical signal to the core optical switch controller 5.

The input port MEMS micro-mirror 41 is configured to reflect, to the output port MEMS micro-mirror 42, the optical signal transmitted by the wedge prism 21. The input port MEMS micro-mirror includes multiple sub-micro-mirrors, and includes an MEMS micro-mirror chip, configured to receive a micro-mirror control signal sent by the core optical switch controller 5, so as to rotate an MEMS micro-mirror. A rotation angle of the input port MEMS micro-mirror 41 is adjustable, so that the optical signal may be reflected to different directions, thereby implementing scheduling on the optical switch.

The output port MEMS micro-mirror 42 is configured to reflect, to the light-splitting triangular prism 22, the optical signal reflected by the input port MEMS micro-mirror 41. The output port MEMS micro-mirror includes multiple sub-micro-mirrors, and includes an MEMS micro-mirror chip, configured to receive the micro-mirror control signal sent by the core optical switch controller 5, so as to rotate the MEMS micro-mirror. A rotation angle of the output port MEMS micro-mirror 42 is adjustable, so that the optical signal may be reflected to different directions, thereby implementing scheduling on the optical switch.

The light-splitting triangular prism 22 is configured to receive the optical signal reflected by the output port MEMS micro-mirror 42, split an output optical signal from the output port MEMS micro-mirror 42 into two channels of optical signals, transmit one channel of optical signal to the output port collimator array 12, and reflect the other channel of optical signal to the output port PD array 32.

Optionally, the light-splitting triangular prism 22 internally includes two film-coated surfaces, one film-coated surface is coated with some reflective films, and the other film-coated surface is coated with a highly reflective film. The some reflective films can perform light splitting on incident optical signals according to a ratio, so that some incident optical signals are transmitted and some are reflected, and the highly reflective film can basically reflect all the incident optical signals. The two surfaces are mutually perpendicular, the some reflective films are at an angle of 45 degrees to a bottom surface, and the highly reflective film is at an angle of 45 degrees to the bottom surface, where the bottom surface is parallel to a plane on which the output port collimator array 12 is located. When the output optical signal from the output port MEMS micro-mirror 42 passes through the some reflective films 221 of the light-splitting triangular prism 22, the some reflective films 221 of the light-splitting triangular prism 22 splits the output optical signal into two channels of optical signals, one channel of optical signal is transmitted to the output port collimator array 12 according to a preset first ratio and the other channel of optical signal is reflected to the highly reflective film 222 of the light-splitting triangular prism 22 according to a preset second ratio, and the highly reflective film 222 of the light-splitting triangular prism 22 reflects all the optical signals to the output port PD array 32, where the preset first ratio is, for example, 95%, the preset second ratio is, for example, 5%, and a sum of the preset first ratio and the preset second ratio is 100%. Specifically, a majority of the optical signals may be transmitted to the output port collimator 12, and a minority of the optical signals may be reflected to the output port PD array 32, that is, the preset first ratio is greater than the preset second ratio, the sum of the first ratio and the second ratio is 100%, and specific numerical values are not limited herein. In specific implementation, the light-splitting triangular prism may be coated with some reflective films according to a preset split ratio, so as to control a ratio of transmission to reflection, for example, a surface of the light-splitting triangular prism may be coated with some corresponding reflective films according to the preset split ratio, 95% of the optical signals are transmitted to the output port collimator array, 5% of the optical signals are reflected to the highly reflective film of the light-splitting triangular prism, and then are all reflected to the output port PD array by the highly reflective film of the light-splitting triangular prism.

Further, optionally, the light-splitting triangular prism is integrally molded, or includes a small light-splitting triangular prism array, where a small light-splitting triangular prism covers one output port collimator.

The output port PD array 32 is configured to detect optical power of the output optical signal reflected by the light-splitting triangular prism 22. The output port PD array 32 performs optical-to-electrical conversion on the received optical signal, to detect the optical power and obtain the optical power of the output optical signal, and sends the detected optical power of the output optical signal to the core optical switch controller 5.

The output port collimator array 12 is configured to receive the optical signal transmitted by the light-splitting triangular prism 22, and couple the received optical signal and output to an optical fiber.

The core optical switch controller 5 is configured to adjust an angle of at least one of the input port MEMS micro-mirror and the output port MEMS micro-mirror according to the optical power, which is detected by the input port PD array 31, of the input optical signal and the optical power, which is detected by the output port PD array 32, of the output optical signal.

Optionally, the core optical switch controller 5 calculates an insertion loss of the 3D-MEMS optical switch according to the optical power, which is detected by the input port PD array 31, of the input optical signal and the optical power, which is detected by the output port PD array 32, of the output optical signal, and when the insertion loss of the 3D-MEMS optical switch does not meet a preset attenuation range, adjusts an angle of at least one of the input port MEMS micro-mirror 41 and the output port MEMS micro-mirror 42, so that the insertion loss of the 3D-MEMS optical switch meets a preset target attenuation value.

Optionally, the core optical switch controller 5 is further specifically configured to adjust an angle of at least one of the input MEMS micro-mirror 41 and the output MEMS micro-mirror 42 according to the calculated insertion loss of the 3D-MEMS optical switch, to make the insertion loss of the 3D-MEMS optical switch be the smallest, that is, to adjust the insertion loss of the 3D-MEMS optical switch to an optimal status.

Optionally, the core optical switch controller 5 is further specifically configured to receive a micro-mirror adjustment control command sent by a user or another device, and adjust an angle of at least one of the input port MEMS micro-mirror 41 and the output port MEMS micro-mirror according to the received micro-mirror adjustment control command, and specifically, send a micro-mirror control signal to at least one of the input port MEMS micro-mirror 41 and the output port MEMS micro-mirror 42, so that after a chip of at least one of the input port MEMS micro-mirror 41 and the output port MEMS micro-mirror 42 receives the micro-mirror control signal sent by the core optical switch controller 5, an MEMS micro-mirror rotates. An angle for coupling the optical signal and the output port collimator array 12 is controlled, a coupling mismatch is formed, and an attenuation power value of the output optical signal is further controlled, which achieves path equalization. In addition, the core optical switch controller 5 receives, in real time, input optical power sent by the input port PD array 31 and output optical power sent by the output port PD array 32, so as to adjust an angle of at least one of the input port MEMS micro-mirror 41 and the output port MEMS micro-mirror according to the calculated insertion loss.

Optionally, the core optical switch controller 5 is further specifically configured to: when the insertion loss of the 3D-MEMS optical switch does not meet the preset attenuation range, adjust an angle of the MEMS micro-mirror, to make the insertion loss of the 3D-MEMS optical switch meet the preset target attenuation value. The preset attenuation range is a range value obtained by setting fluctuating values before and after the preset target attenuation value, for example, the preset target attenuation value is 3 dB, a range of ±0.2 dB is set, and the preset attenuation range is 2.8 dB to 3.2 dB. The core optical switch controller 5 receives, in real time, the optical power, which is sent by the input port PD array 31, of the input optical signal and the optical power, which is sent by the output port PD array 32, of the output optical signal; calculates an insertion loss according to the received optical power of the input optical signal and the received optical power of the output optical signal; determines whether the calculated insertion loss is within the preset attenuation range; if the calculated insertion loss is not within the preset attenuation range, starts to adjust an angle of at least one of the input port MEMS micro-mirror 41 and the output port MEMS micro-mirror 42; after the adjustment, receives, again in real time, the optical power of the input optical signal and the optical power of the output optical signal; calculates an insertion loss again; determines again whether the calculated insertion loss is within the preset attenuation range; and if the insertion loss is not in the preset attenuation range, continues to adjust the angle of at least one of the input port MEMS micro-mirror 41 and the output port MEMS micro-mirror 42. This process is repeated until the insertion loss meets the preset target attenuation value.

Specifically, the core optical switch controller adjusts the rotation angle of at least one of the input port MEMS micro-mirror and the output port MEMS micro-mirror, and if a insertion loss currently is close to the preset target attenuation value, rotation to the direction is continued; if the insertion loss currently is far from the preset target attenuation value, rotation to an opposite direction is performed; if the insertion loss currently is far from the preset target attenuation value regardless of which direction the MEMS micro-mirror rotates in, it is considered that the MEMS micro-mirror is adjusted to an optimal position, and the adjustment is stopped. If a time for adjusting the MEMS micro-mirror reaches a preset termination time, the adjustment is stopped, for example, the MEMS micro-mirror is not yet adjusted to the optimal position after 60 seconds, the circulation is terminated, and the adjustment is ended until next adjustment is triggered and starts.

Further, optionally, a plane on which the input port PD array 31 is located may be parallel to a plane on which the output port PD array 32 is located, a plane on which the input port collimator array 11 is located may be parallel to a plane on which the output port collimator array 12 is located, and a plane on which the input port MEMS micro-mirror 41 is located may be parallel to a plane on which the output port MEMS micro-mirror 42 is located; the plane on which the input port PD array 31 is located may be parallel to the plane on which the input port MEMS micro-mirror 41 is located, and the plane on which the output port PD array 32 is located may be parallel to the plane on which the output port MEMS micro-mirror 42 is located; further, optionally, the input port PD array 31 may be integrated with the input port MEMS micro-mirror 41, and the output port PD array 32 may be integrated with the output port MEMS micro-mirror 42, which therefore can lower a difficulty of a packaging process of the 3D-MEMS optical switch, and simplifies an architecture of an optical switch and reduces a volume of the optical switch.

Further, optionally, the input port PD array 31 may include multiple sub-PD arrays, the output port PD array 32 may include multiple sub-PD arrays, and by using the multiple sub-PD arrays, a yield rate of the PD array can be improved, and it is also easy to find a bad point.

The 3D-MEMS optical switch provided by this embodiment of the present invention includes: an input port collimator array 11, a wedge prism 21, an input port PD array 31, an input port MEMS micro-mirror 41, an output port MEMS micro-mirror 42, a light-splitting triangular prism 22, an output port PD array 32, an output port collimator array 12, and a core optical switch controller 5. A PD array is integrated into a core optical switch, which simplifies an architecture of the optical switch and reduces a volume of the optical switch; the wedge prism and the light-splitting triangular prism are used to apply some reflected optical signals to optical channel detection, and apply transmission light to cross-connection and grooming, which simplifies a design of a space optical channel, facilitates implementation of a large-scale 3D-MEMS optical switch, and reduces costs.

Figure 4:
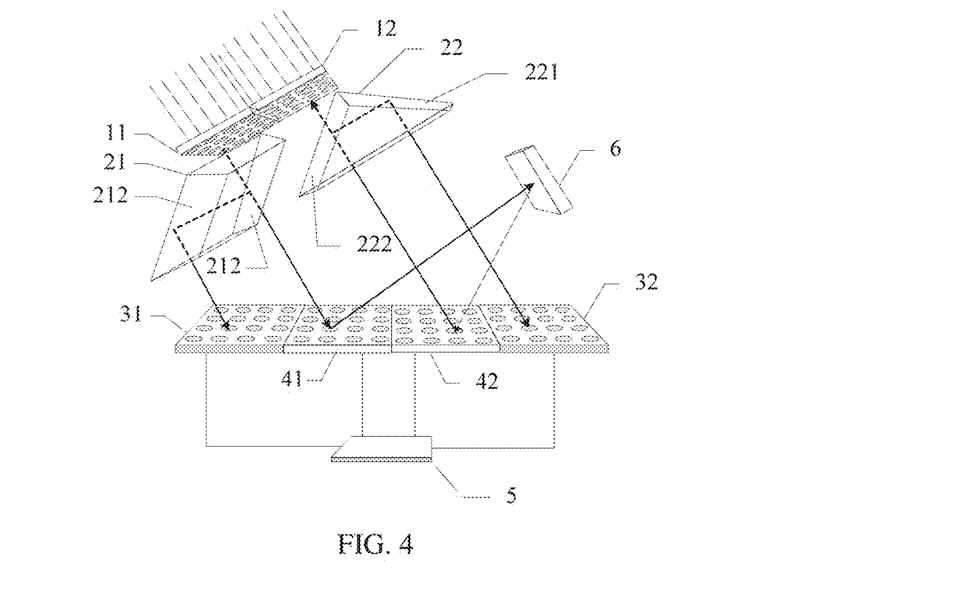
FIG. 4 is a specific schematic structural diagram of a 3D-MEMS optical switch according to a second embodiment of the present invention.

FIG. 4 is a schematic structural diagram of a 3D-MEMS optical switch according to a second embodiment of the present invention. As shown in the figure, the 3D-MEMS optical switch in this embodiment of the present invention includes: an input port collimator array 11, a wedge prism 21, an input port PD array 31, an input port MEMS micro-mirror 41, an output port MEMS micro-mirror 42, a light-splitting triangular prism 22, an output port PD array 32, an output port collimator array 12, a core optical switch controller 5, and a reflector 6, where the core optical switch controller 5 is in communication connection with the input port PD array 31, the input port MEMS micro-mirror 41, the output port MEMS micro-mirror 42, and the output port PD array 32.

The input port PD array 31 and the output port PD array 32 are located on a same plane, the input port collimator array 11 and the output port collimator array 12 are located on a same plane, the input port MEMS micro-mirror 41 and the output port MEMS micro-mirror 42 are located on a same plane, and the input port PD array 31 and the input port MEMS micro-mirror 41 are located on a same plane.

The input port collimator array 11 is configured to receive an optical signal that is input from an optical fiber.

The wedge prism 21 is disposed between the input port collimator array 11 and the input port MEMS micro-mirror 41, and is configured to receive an optical signal from the input port collimator array 11, split the input optical signal received from the input port collimator array 11 into two channels of optical signals, transmit one channel of optical signal to the input port MEMS micro-mirror 41, and reflect the other channel of optical signal to the input port PD array 31.

Optionally, the wedge prism 21 includes two film-coated surfaces, one film-coated surface is coated with some reflective films, and the other film-coated surface is coated with a highly reflective film. The two surfaces are parallel, and are at an angle of 45 degrees to an upper horizontal plane, the upper horizontal plane is parallel to the plane on which the input port collimator array 11 is located, and details are specifically described in the first embodiment of the present invention in FIG. 3, and are not described herein again.

The input port PD array 31 is configured to detect optical power of the input optical signal reflected by the wedge prism 21, and send the detected optical power of the input optical signal to the core optical switch controller 5.

The input port MEMS micro-mirror 41 is configured to reflect, to the reflector 6, the optical signal transmitted by the wedge prism 21. The input port MEMS micro-mirror 41 includes multiple sub-micro-mirrors, and includes an MEMS micro-mirror chip, configured to receive a micro-mirror control signal sent by the core optical switch controller 5, so as to rotate an MEMS micro-mirror.

The reflector 6 is disposed between the input port MEMS micro-mirror 41 and the output port MEMS micro-mirror 42, and is configured to reflect, to the output port MEMS micro-mirror 42, the optical signal reflected by the input port MEMS micro-mirror 41.

The output port MEMS micro-mirror 42 is configured to reflect, to the light-splitting triangular prism 22, the optical signal reflected by the reflector 6. The output port MEMS micro-mirror includes multiple sub-micro-mirrors, and includes an MEMS micro-mirror chip, configured to receive the micro-mirror control signal sent by the core optical switch controller 5, so as to rotate the MEMS micro-mirror.

The light-splitting triangular prism 22 is configured to receive the optical signal reflected by the output port MEMS micro-mirror 42, split an output optical signal from the output port MEMS micro-mirror 42 into two channels of optical signals, transmit one channel of optical signal to the output port collimator array 12, and reflect the other channel of optical signal to the output port PD array 32. Optionally, the light-splitting triangular prism 22 includes two film-coated surfaces, one film-coated surface is coated with some reflective films, and the other film-coated surface is coated with a highly reflective film. The two surfaces are perpendicular, the some reflective films 221 is at an angle of 45 degrees to a bottom surface, the highly reflective film 222 is at an angle of 45 degrees to the bottom surface, and details are specifically described in the first embodiment of the present invention in FIG. 3, and are not described herein again.

The output port PD array 32 is configured to detect output optical power of the output optical signal reflected by the light-splitting triangular prism 22, and send the detected output optical power to the core optical switch controller 5.

The output port collimator array 12 is configured to receive the optical signal transmitted by the light-splitting triangular prism 22, and couple the received optical signal and output to an optical fiber.

The core optical switch controller 5 is configured to adjust an angle of at least one of the input port MEMS micro-mirror and the output port MEMS micro-mirror according to the optical power, which is detected by the input port PD array 31, of the input optical signal and the optical power, which is detected by the output port PD array 32, of the output optical signal.

Optionally, the core optical switch controller 5 calculates an insertion loss of the 3D-MEMS optical switch according to the optical power, which is detected by the input port PD array 31, of the input optical signal and the optical power, which is detected by the output port PD array 32, of the output optical signal, and when the insertion loss of the 3D-MEMS optical switch does not meet a preset attenuation range, adjusts an angle of at least one of the input port MEMS micro-mirror 41 and the output port MEMS micro-mirror 42, so that the insertion loss of the 3D-MEMS optical switch meets a preset target attenuation value. Details are specifically described in the first embodiment of the present invention in FIG. 3, and are not described herein again.

Further, optionally, the input port collimator array 11 may be integrated with the output port collimator array 12. In specific implementation, the input port collimator array 11 and the output port collimator array 12 may be two separate collimator arrays that are spliced together, which is convenient to package; or an entire collimator array may be integrally designed, and then the entire collimator array is divided into two subareas, where one subarea is an input area, the other subarea is an output area, the input area corresponds to the input port collimator array, and the output area corresponds to the output port collimator array.

Further, optionally, the input port MEMS micro-mirror 41 may be integrated with the output port MEMS micro-mirror 42, and an MEMS micro-mirror is on an MEMS chip; the input port MEMS micro-mirror 41 and the output port MEMS micro-mirror 42 may be two separate micro-mirrors that are spliced together, and the MEMS chip may also be integrally designed, that is, the entire MEMS chip is integrally packaged; then, the entire MEMS chip is divided into two subareas, where one subarea is an input area, the other subarea is an output area, the input area corresponds to the input port MEMS micro-mirror, the output area corresponds to the output port MEMS micro-mirror, and there are multiple MEMS micro-mirrors in each of the input area and the output area.

Further, optionally, the PD array and the MEMS micro-mirror may be located on a same plane. Further, optionally, the PD array may be integrated with the MEMS micro-mirror, where the input port MEMS micro-mirror 41 and the output port MEMS micro-mirror 42 are in the middle, and the input port PD array and the output port PD array are on two sides.

Further, optionally, the PD array may include multiple sub-PD arrays, and by using the multiple sub-PD arrays, a yield rate of the PD array can be improved, and it is also easy to find a bad point.

This embodiment of the present invention provides a 3D-MEMS optical switch, including: an input port collimator array 11, a wedge prism 21, an input port PD array 31, an input port MEMS micro-mirror 41, an output port MEMS micro-mirror 42, a light-splitting triangular prism 22, an output port PD array 32, an output port collimator array 12, a core optical switch controller 5, and a reflector 6. A PD array is integrated into a core optical switch, which simplifies an architecture of the optical switch and reduces a volume of the optical switch; the wedge prism and the light-splitting triangular prism are used to apply reflected optical signals to optical channel detection, and apply transmission light to cross-connection and grooming; the reflector 6 folds an optical channel, so that the input port PD array 31 and the output port PD array 32 are located on a same plane, the input port collimator array 11 and the output port collimator array 12 are located on a same plane, and the input port MEMS micro-mirror 41 and the output port MEMS micro-mirror 42 are located on a same plane, and further, the input port collimator array 11 may be integrated with the output port collimator array 12, or the input port MEMS micro-mirror 41 is integrated with the output port MEMS micro-mirror 42, which lowers a difficulty of implementing the optical switch, simplifies a design of a space optical channel, facilitates implementation of a large-scale 3D-MEMS optical switch, and reduces costs.

Figure 5:
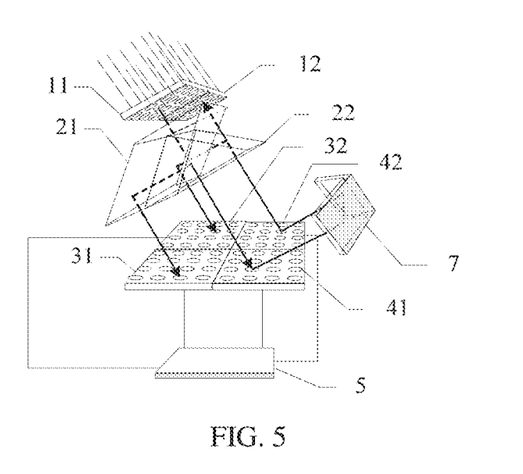
FIG. 5 is a specific schematic structural diagram of a 3D-MEMS optical switch according to a third embodiment of the present invention.

FIG. 5 is a schematic structural diagram of a 3D-MEMS optical switch according to a third embodiment of the present invention. As shown in the figure, the 3D-MEMS optical switch in this embodiment of the present invention includes: an input port collimator array 11, a wedge prism 21, an input port PD array 31, an input port MEMS micro-mirror 41, an output port MEMS micro-mirror 42, a light-splitting triangular prism 22, an output port PD array 32, an output port collimator array 12, a core optical switch controller 5, and a reflecting triangular prism 7, where the core optical switch controller 5 is in communication connection with the input port PD array 31, the input port MEMS micro-mirror 41, the output port MEMS micro-mirror 42, and the output port PD array 32.

The input port PD array 31 and the output port PD array 32 are located on a same plane, the input port collimator array 11 and the output port collimator array 12 are located on a same plane, the input port MEMS micro-mirror 41 and the output port MEMS micro-mirror 42 are located on a same plane, and the input port PD array 31 and the input port MEMS micro-mirror 41 are located on a same plane.

The input port collimator array 11 is configured to receive an optical signal that is input from an optical fiber.

The wedge prism 21 is configured to receive the optical signal from the input port collimator array 11, split an input optical signal received from the input port collimator array 11 into two channels of optical signals, transmit one channel of optical signal to the input port MEMS micro-mirror 41, and reflect the other channel of optical signal to the input port PD array 31. Optionally, the wedge prism 21 includes two film-coated surfaces, one film-coated surface is coated with some reflective films, and the other film-coated surface is coated with a highly reflective film. The two surfaces are parallel, and are at an angle of 45 degrees to an upper horizontal plane. Details are specifically described in the first embodiment of the present invention in FIG. 3, and are not described herein again.

The input port PD array 31 is configured to reflect, to the reflecting triangular prism 7, the optical signal transmitted by the wedge prism 21. The input port MEMS micro-mirror 41 includes multiple sub-micro-mirrors, and includes an MEMS micro-mirror chip, configured to receive a micro-mirror control signal sent by the core optical switch controller 5, so as to rotate an MEMS micro-mirror.

The reflecting triangular prism 7 is disposed between the input port MEMS micro-mirror 41 and the output port MEMS micro-mirror 42, and is configured to reflect, to the output port MEMS micro-mirror 42, the optical signal reflected by the input port MEMS micro-mirror 41.

The output port MEMS micro-mirror 42 is configured to reflect, to the light-splitting triangular prism 22, the optical signal reflected by the reflecting triangular prism 7. The output port MEMS micro-mirror includes multiple sub-micro-mirrors, and includes an MEMS micro-mirror chip, configured to receive the micro-mirror control signal sent by the core optical switch controller 5, so as to rotate the MEMS micro-mirror.

The light-splitting triangular prism 21 is configured to receive the optical signal reflected by the output port MEMS micro-mirror 42, split an output optical signal from the output port MEMS micro-mirror 42 into two channels of optical signals, transmit one channel of optical signal to the output port collimator array 12, and reflect the other channel of optical signal to the output port PD array 32. Optionally, the light-splitting triangular prism 21 includes two film-coated surfaces, one film-coated surface is coated with some reflective films, and the other film-coated surface is coated with a highly reflective film. The two surfaces are perpendicular, the some reflective films 221 is at an angle of 45 degrees to a bottom surface, the highly reflective film 222 is at an angle of 45 degrees to the bottom surface, and details are specifically described in the first embodiment of the present invention in FIG. 3, and are not described herein again.

The output port PD array 32 is configured to detect output optical power of the output optical signal reflected by the light-splitting triangular prism 22, and send the detected output optical power to the core optical switch controller 5.

The output port collimator array 12 is configured to receive the optical signal transmitted by the light-splitting triangular prism 22, and couple the received optical signal with an optical fiber for outputting.

The core optical switch controller 5 is configured to adjust an angle of at least one of the input port MEMS micro-mirror and the output port MEMS micro-mirror according to the optical power, which is detected by the input port PD array 31, of the input optical signal and the optical power, which is detected by the output port PD array 32, of the output optical signal.

Optionally, the core optical switch controller 5 calculates an insertion loss of the 3D-MEMS optical switch according to the optical power, which is detected by the input port PD array 31, of the input optical signal and the optical power, which is detected by the output port PD array 32, of the output optical signal, and when the insertion loss of the 3D-MEMS optical switch does not meet a preset attenuation range, adjusts an angle of at least one of the input port MEMS micro-mirror 41 and the output port MEMS micro-mirror 42, so that the insertion loss of the 3D-MEMS optical switch meets a preset target attenuation value. Details are specifically described in the first embodiment of the present invention in FIG. 3, and are not described herein again.

Further, optionally, the input port PD array 31 may be integrated with the output port PD array 32. In specific implementation, the input port PD array 31 and the output port PD array 32 may be two separate PD arrays that are spliced together, which is convenient to package; or an entire PD array may be integrally designed, and then the entire PD array is divided into two subareas, where one subarea is an input area, the other subarea is an output area, the input area corresponds to the input port PD array, and the output area corresponds to the output port PD array.

Further, optionally, the PD array may include multiple sub-PD arrays, and by using the multiple sub-PD arrays, a yield rate of the PD array can be improved, and it is also easy to find a bad point.

Further, optionally, the input port MEMS micro-mirror 41 may be integrated with the output port MEMS micro-mirror 42. An MEMS micro-mirror is on an MEMS chip, the input port MEMS micro-mirror 41 and the output port MEMS micro-mirror 42 may be two separate micro-mirrors that are spliced together, and the MEMS chip may also be integrally designed, that is, the entire MEMS chip is integrally packaged; then, the entire MEMS chip is divided into two subareas, where one subarea is an input area, the other subarea is an output area, the input area corresponds to the input port MEMS micro-mirror, the output area corresponds to the output port MEMS micro-mirror, and there are multiple MEMS micro-mirrors in each of the input area and the output area.

Further, optionally, the input port PD array 31, the output port PD array 32, the input port MEMS micro-mirror 41, and the output port MEMS micro-mirror 42 may be integrated.

Further, optionally, the input port collimator array 11 may be integrated with the output port collimator array 12. The input port collimator array 11 and the output port collimator array 12 may be two separate arrays that are spliced together; a collimator array may also be integrally designed, that is, the entire collimator array is integrally packaged, and then the entire collimator array is divided into two subareas, where one subarea is an input area, the other subarea is an output area, the input area corresponds to the input port collimator array, and the output area corresponds to the output port collimator array.

The 3D-MEMS optical switch in this embodiment of the present invention includes: an input port collimator array 11, a wedge prism 21, an input port PD array 31, an input port MEMS micro-mirror 41, an output port MEMS micro-mirror 42, a light-splitting triangular prism 22, an output port PD array 32, an output port collimator array 12, a core optical switch controller 5, and a reflecting triangular prism 7. A PD array is integrated into a core optical switch, which simplifies an architecture of the optical switch and reduces a volume of the optical switch; the wedge prism and the light-splitting triangular prism are used to apply reflected optical signals to optical channel detection, and apply transmission light to cross-connection and grooming; the reflecting triangular prism 7 folds an optical channel, so that the input port PD array 31 and the output port PD array 32 are located on a same plane, the input port collimator array 11 and the output port collimator array 12 are located on a same plane, and the input port MEMS micro-mirror 41 and the output port MEMS micro-mirror 42 are located on a same plane, and further, the input port PD array 31 may be integrated with the output port PD array 32, the input port collimator array 11 is integrated with the output port collimator array 12, the input port MEMS micro-mirror 41 is integrated with the output port MEMS micro-mirror 42, or the input port PD array 31, the output port PD array 32, the input port MEMS micro-mirror 41, and the output port MEMS micro-mirror 42 are integrated, which lowers a difficulty of implementing the optical switch, simplifies a design of a space optical channel, facilitates implementation of a large-scale 3D-MEMS optical switch, and reduces costs.

Through descriptions of the foregoing embodiments, a person skilled in the art may clearly understand that the present invention may be implemented by hardware, firmware or a combination thereof. What is disclosed above is merely exemplary embodiments of the present invention, and certainly is not intended to limit the scope of rights of the present invention. Therefore, equivalent variations made according to the claims of the present invention shall fall within the scope of the present invention.

What is claimed is:

1. A 3-dimensional micro-electro-mechanical system (3D-MEMS) optical switch, the 3D-MEMS optical switch comprising:
an input port collimator array;
an input port MEMS micro-mirror;
an output port MEMS micro-mirror;
an output port collimator array;
a wedge prism;
a light-splitting triangular prism;
an input port power detector (PD) array;
an output port PD array; and
a core optical switch controller,
wherein the wedge prism is disposed between the input port collimator array and the input port MEMS micro-mirror, the wedge prism being configured to:
split an input optical signal from the input port collimator array into two channels of optical signals,
transmit one channel of optical signal to the input port MEMS micro-mirror, and
reflect the other channel of optical signal to the input port PD array,
wherein the input port PD array is configured to detect a first optical power of the input optical signal reflected by the wedge prism,
wherein the output port MEMS micro-mirror is configured to reflect to the light-splitting triangular prism the optical signal from the input port MEMS micro-mirror,
wherein the light-splitting triangular prism is disposed between the output port MEMS micro-mirror and the output port collimator array, the light-splitting triangular being configured to:
split an output optical signal from the output port MEMS micro-mirror into two channels of optical signals,
transmit one channel of optical signal to the output port collimator array, and
reflect the other channel of optical signal to the output port PD array,
wherein the output port PD array is configured to detect a second optical power of the output optical signal reflected by the light-splitting triangular prism, and
wherein the core optical switch controller is configured to determine, according to the first optical power and the second optical power, whether at least one of the input port MEMS micro-mirror and the output port MEMS micro-mirror needs to be adjusted, and when an adjustment is needed, adjust at least one of the input port MEMS micro-mirror and the output port MEMS micro-mirror.

2. The 3D-MEMS optical switch according to claim 1, wherein the wedge prism comprises two film-coated surfaces, wherein the two film-coated surfaces are parallel and at an angle of 45 degrees to an upper horizontal plane of the wedge prism, wherein one film-coated surface is coated with some reflective films, and the other film-coated surface is coated with a highly reflective film, wherein the some reflective films are configured to split the input optical signal from the input port collimator array into two channels of optical signals, to transmit one channel of the optical signal to the input port MEMS micro-mirror, and to reflect the other channel of the optical signal to the highly reflective film, and wherein the highly reflective film is configured to reflect, to the input port PD array, the optical signal reflected by the some reflective films.

3. The 3D-MEMS optical switch according to claim 1, wherein the light-splitting triangular prism comprises two film-coated surfaces, wherein the two film-coated surfaces are mutually perpendicular, wherein one film-coated surface is coated with some reflective films and is located at an angle of 45 degrees to a bottom surface of the light-splitting triangular prism, wherein the other film-coated surface is coated with a highly reflective film and is located at an angle of 45 degrees to a bottom surface of the wedge prism, wherein the some reflective films are configured to split the output optical signal from the output port MEMS micro-mirror into two channels of optical signals, to transmit one channel of the optical signal to the output port collimator array, and to reflect the other channel of the optical signal to the highly reflective film, and wherein the highly reflective film is configured to reflect, to a PD array, the optical signal reflected by the some reflective films.

4. The 3D-MEMS optical switch according to claim 1, wherein the wedge prism is fastened to the input port collimator array or to an optical channel between the input port collimator array and the input port MEMS micro-mirror.

5. The 3D-MEMS optical switch according to claim 1, wherein the light-splitting triangular prism is fastened to the output port collimator array or to an optical channel between the output port collimator array and the output port MEMS micro-mirror.

6. The 3D-MEMS optical switch according to claim 1, wherein the wedge prism is integrally molded or comprises a small wedge prism array covering one input port collimator.

7. The 3D-MEMS optical switch according to claim 1, wherein the light-splitting triangular prism is integrally molded or comprises a small light-splitting triangular prism array covering one output port collimator.

8. The 3D-MEMS optical switch according to claim 1,
wherein a plane on which the input port collimator array is located is parallel to a plane on which the output port collimator array is located,
wherein a plane on which the input port PD array is located is parallel to a plane on which the output port PD array is located, and
wherein a plane on which the input port MEMS micro-mirror is located is parallel to a plane on which the output port MEMS micro-mirror is located.

9. The 3D-MEMS optical switch according to claim 1, wherein the core optical switch controller is configured to adjust at least one of the input port MEMS micro-mirror and the output port MEMS micro-mirror according to the first optical power and the second optical power comprises to calculate an insertion loss of the 3D-MEMS optical switch according to the first optical power and the second optical power, and when the insertion loss of the 3D-MEMS optical switch is not within a preset attenuation range, to adjust an angle of at least one of the input port MEMS micro-mirror and the output port MEMS micro-mirror.

10. The 3D-MEMS optical switch according to claim 1, further comprising a reflector disposed between the input port MEMS micro-mirror and the output port MEMS micro-mirror, wherein the input port MEMS micro-mirror is configured to reflect, to the reflector, the optical signal transmitted by the wedge prism, wherein the reflector is configured to reflect, to the output port MEMS micro-mirror, the optical signal reflected by the input port MEMS micro-mirror, and wherein the output port MEMS micro-mirror is configured to reflect, to the light-splitting triangular prism, the optical signal reflected by the reflector.

11. The 3D-MEMS optical switch according to claim 1, further comprising a reflecting triangular prism disposed between the input port MEMS micro-mirror and the output port MEMS micro-mirror, wherein the input port MEMS micro-mirror is configured to reflect, to the reflecting triangular prism, the optical signal transmitted by the wedge prism, wherein the reflecting triangular prism is configured to reflect, to the output port MEMS micro-mirror, the optical signal reflected by the input port MEMS micro-mirror, and wherein the output port MEMS micro-mirror is configured to reflect, to the light-splitting triangular prism, the optical signal reflected by the reflecting triangular prism.

12. The 3D-MEMS optical switch according to claim 10, wherein the input port collimator array and the output port collimator array are located on the same plane, wherein the input port PD array and the output port PD array are disposed on the same plane, and wherein the input port MEMS micro-mirror and the output port MEMS micro-mirror are located on the same plane.

13. The 3D-MEMS optical switch according to claim 12, wherein the input port collimator array is integrated with the output port collimator array.

14. The 3D-MEMS optical switch according to claim 12, wherein the input port PD array is integrated with the output port PD array.

15. The 3D-MEMS optical switch according to claim 12, wherein the input port MEMS micro-mirror is integrated with the output port MEMS micro-mirror.

16. The 3D-MEMS optical switch according to claim 1, wherein the input port PD array comprises multiple sub-PD arrays.

17. The 3D-MEMS optical switch according to claim 1, wherein the output port PD array comprises multiple sub-PD arrays.

* * * * *